(12) United States Patent
Kemper

(10) Patent No.: US 6,413,366 B1
(45) Date of Patent: Jul. 2, 2002

(54) METHOD AND DEVICE FOR FLOTATION OF POLLUTANTS FROM AN AQUEOUS FIBROUS MATERIAL SUSPENSION

(75) Inventor: Martin Kemper, Weingarten (DE)

(73) Assignee: Voith Sulzer Papiertechnik Patent GmbH, Ravensburg (DE)

(*) Notice: Subject to any disclaimer, the term of this patent is extended or adjusted under 35 U.S.C. 154(b) by 0 days.

(21) Appl. No.: 09/623,498

(22) PCT Filed: May 4, 1999

(86) PCT No.: PCT/EP99/03008
§ 371 (c)(1),
(2), (4) Date: Sep. 19, 2000

(87) PCT Pub. No.: WO99/61699
PCT Pub. Date: Feb. 12, 1999

(30) Foreign Application Priority Data

May 22, 1998 (DE) .......................... 198 23 053

(51) Int. Cl.⁷ ............................................. D21C 9/02
(52) U.S. Cl. ................. 162/60; 162/4; 209/164; 209/168; 209/725; 210/703; 210/221.1
(58) Field of Search .................. 162/4, 5, 189, 162/190, 191, 199, 55, 60, 9, 69; 209/164, 168, 170; 210/703, 704, 705, 706, 707, 221.1; 252/61; 510/174; 8/156; 68/43, 181 R

(56) References Cited

U.S. PATENT DOCUMENTS

| | | | |
|---|---|---|---|
| 3,787,316 A | * | 1/1974 | Brink et al. .................... 210/6 |
| 4,203,837 A | * | 5/1980 | Hoge et al. .................... 210/44 |
| 4,331,534 A | * | 5/1982 | Barnscheidt ................. 209/164 |
| 5,069,751 A | * | 12/1991 | Chamblee et al. ............. 162/5 |
| 5,341,938 A | * | 8/1994 | Valenzuela et al. ......... 209/164 |
| 5,876,558 A | * | 3/1999 | Deng et al. .................... 162/4 |

FOREIGN PATENT DOCUMENTS

EP 0798416 10/1997 ............ D21B/1/32

* cited by examiner

Primary Examiner—Peter Chin
Assistant Examiner—Eric Hug
(74) Attorney, Agent, or Firm—Greenblum & Bernstein, P.L.C.

(57) ABSTRACT

Process and device for the flotation of contaminates out of an aqueous fibrous suspension using a foam. The process includes creating the foam, introducing the fibrous suspension into the foam, transferring contaminates from the fibrous suspension to the foam, and removing some portion of the fibrous suspension from the foam as an accepted stock. The device includes a liquid containing area, a mechanism for introducing a gas into the liquid containing area, and a mechanism for introducing the fibrous suspension into a foam containing area arranged to be adjacent the liquid containing area.

31 Claims, 2 Drawing Sheets

US 6,413,366 B1

METHOD AND DEVICE FOR FLOTATION OF POLLUTANTS FROM AN AQUEOUS FIBROUS MATERIAL SUSPENSION

BACKGROUND OF THE INVENTION

1. Field of the Invention

The invention relates to a process for the flotation of contaminating material out of an aqueous fibrous suspension 1.

2. Description of Background and Relevant Information

Such processes are used for separating at least a part of the suspended contaminating particles out of a suspension containing fibrous material. In flotation, a foam or scum containing the material to be separated out is known to form. A typical use for such a process is the processing of an aqueous fibrous suspension made of printed used paper in which the ink particles have already separated from the fibers so that they can be floated off. The flotation process described here utilizes the differences between fibrous material and undesired solid particles in such a way that the fibrous material remains in the fiber suspension due to its hydrophilic nature whereas the mentioned material particles are hydrophobic and, therefore, move into the foam along with the air bubbles. Aside from the ink particles, there is a multitude of other materials that are hydrophobic and which, therefore, can be separated from the fibrous material by means of flotation. Such materials are, in particular, adhesives, fine plastic particles, and, probably resins as well. When fibers are to be separated from contaminants by the process of flotation. i.e., not all solid particles are to be sorted out, it is called selective flotation. The term "flotation de-inking," which is also used, is normally used not only for the removal of ink particles, but also more generally for the selective flotation of contaminating particles out of fibrous suspensions.

The prior art relating to the process of flotation for fibrous suspensions is already very advanced. Therefore. there are solutions which are appropriate for removing a large part of the solid particles by flotation.

In EP 0 798 416 A1, a flotation process for a fibrous suspension is described. This suspension is mixed with a gas, e.g., air, and introduced directly into an existing suspension already in a flotation container. The solid matter to be separated from the suspension reaches the flotation foam with the aid of air bubbles. For the purpose of improving this process, this publication suggests adding a liquid, which can be, e.g., water with or without chemicals, in a very specific way to the flotation foam thus formed.

Since flotation devices are relatively expensive in their production and use, it is an understandable goal to improve their effectiveness or to reduce the expense necessary for achieving the same results.

SUMMARY OF THE INVENTION

The invention therefore provides for a flotation process in which good purification results can be achieved while simultaneously keeping the installation and operating expenses as low as possible.

A process for the flotation of contaminates out of an aqueous fibrous suspension using a foam, the process includes creating the foam, introducing the fibrous suspension into the foam, transferring contaminates from the fibrous suspension to the foam, and removing some portion of the fibrous suspension from the foam as an accepted stock.

Through the process according to the invention, the optimal utilization of the means employed is possible. In particular, the gas used for the flotation, especially air, can be utilized optimally. The unaerated fibrous suspension is added directly into the rising foam or at a location from which it can, in opposition to the rising direction of the foam, arrive immediately therein. Therefore, it strikes a preexisting air bubble composite with imbedded liquid channels through which the suspension sinks down. Thus, it achieves optimal contact to the bubble surfaces. Additionally, it is advantageous that the principle of inverse flow can be realized in this manner. This means that the "dirtiest" suspension comes into contact with the already heavily loaded air bubbles, becomes increasingly cleaner on its way down where, therefore, the air bubbles encountered are carrying less dirt.

BRIEF DESCRIPTION OF THE DRAWINGS

The invention and its advantages are explained with the use of drawings. It is depicted in.

DETAILED DESCRIPTION OF THE INVENTION

Figure 1:
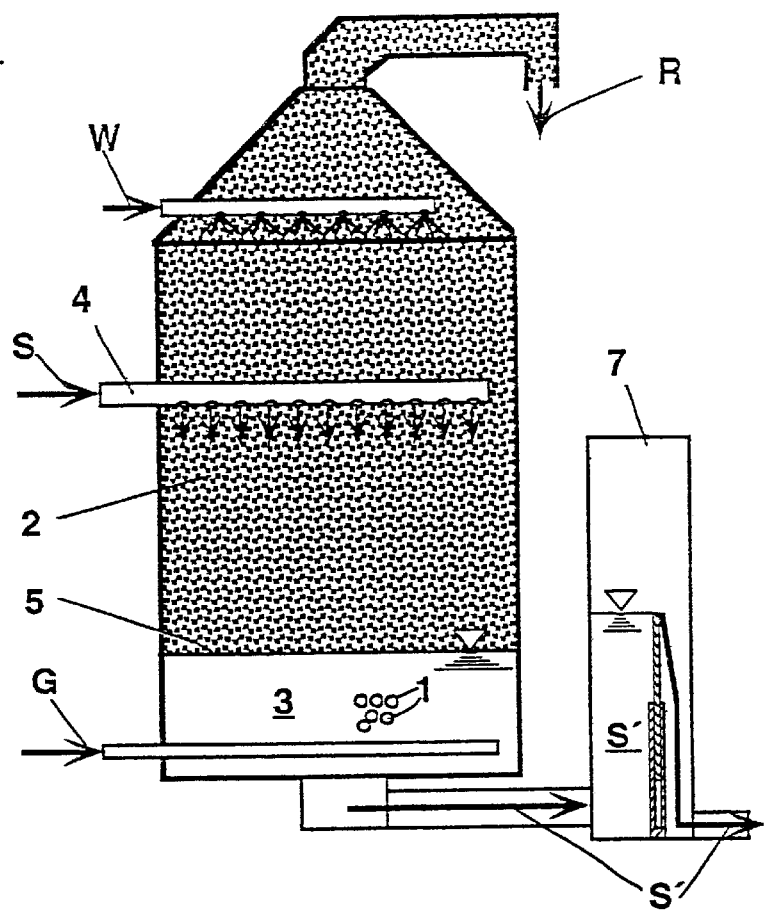
FIG. 1 schematically: performance of the process according to the invention in a flotation column.

In FIG. 1, the flotation process is performed as a column flotation in which essentially vertical currents are produced. The gas bubbles 1, of which only few are drawn and they are oversized, formed by introducing the gas G, e.g., through porous pipes in the bottom area of the flotation cell, rise out of the liquid layer 3 against the prevailing gravitational field. Generally, the prevailing gravitational field can be the earth's gravity or can be increased by centrifugal forces in embodiments that differ accordingly. (In such cases "up" means "in opposite direction to the gravitational force.") The risen bubbles collect in the foam 2 above the liquid layer 3. Into this foam, a fibrous suspension S is introduced through a feed pipe 4, and then sinks down against the rising direction of the foam. Due to the great number of air bubbles the downward current is very finely dispersed so that there is an accordingly high probability that the contaminants will accumulate in the air bubbles. According to the standard definition, foam has a gas content of at least 50% by volume. Due to the influx of the suspension the air content reduces locally in the feed point of the feed pipe 4. Therefore, it can increase during travel against the rising direction of the foam. In flotation in normal earth gravity, this means that below the suspension inflow, there is a zone with a higher air content. Then, by way of a more or less fluctuant dividing area 5, the transition occurs from the foam 2 to the liquid layer 3 of the aerated suspension, which has a lower air content. An aerated suspension is known as a gas-in-liquid-dispersion and foam as a liquid-in-gas-dispersion.

In this schematic representation, the feed pipe 4 is only implied. In a technical device, it must be constructed in such a way that as even a dispersion of the added fibrous suspension S as possible is achieved. After the completed purification. the fibrous suspension collects in the liquid layer 3 and can be drained as accepted stock S'. Between the liquid layer 3 and the foam 2 is the dividing area 5. Due to its density and the height of the liquid, the aerated suspension creates a static pressure. which must be compensated at the outlet of the accepted stock S'. Therefore, the counterpressure applied here determines the position of the dividing area 5. A water seal 7 with an adjustable level can be used for this purpose.

The foam 2 continues to flow upwards above the feed pipe 4 until it can be removed as the flotation foam R together with the contained contaminants. Not always necessary, but advantageous. is the addition of cleaning water W to the foam 2 because this avoids or at least reduces the possible loss of fibers.

Figure 2:
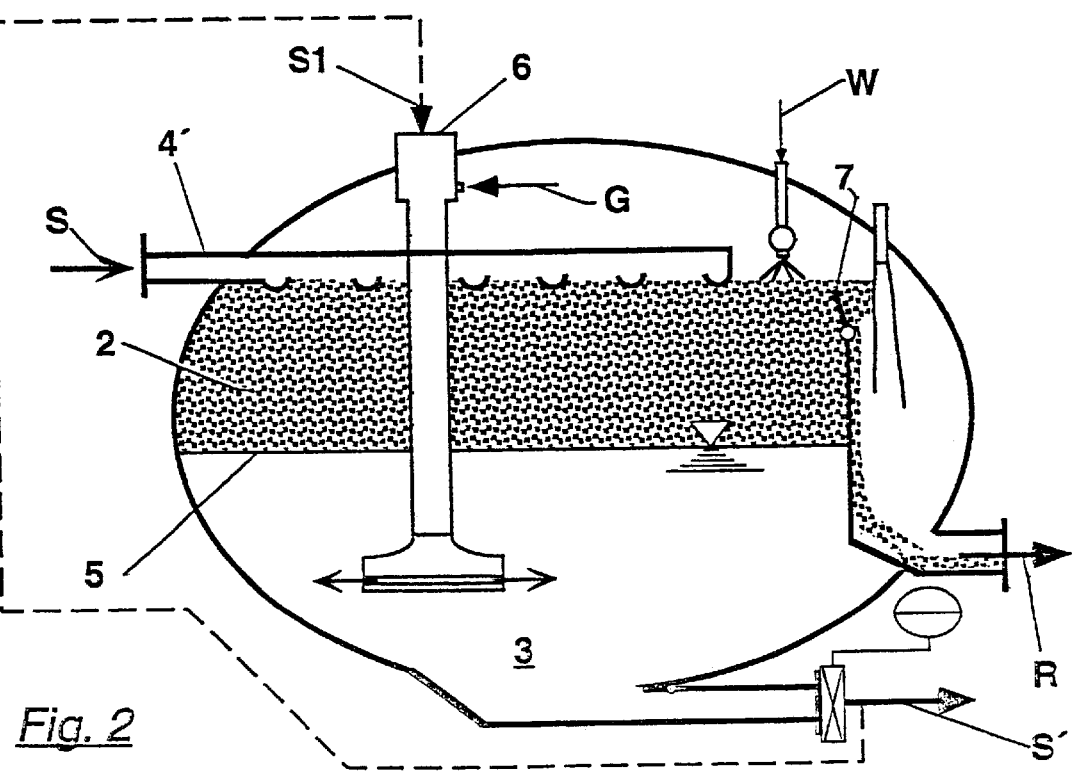
FIG. 2 schematically: performance of the process in a pipe cell.

FIG. 2 depicts how the known pipe cell used for the flotation can be varied so that the process according to the invention is possible using it. It is crucial for a feed point 4' to be provided so that it can introduce the fibrous suspension S evenly into the pipe cell, at least onto a part of the foam 2. In the example shown here, the feed point 4' is positioned above the upper foam limit. Therefore. the introduced fibrous suspension S flows through the entire foam layer, which results in an especially good utilization of the principle used in the invention. The foam 2 flows off at the side over a foam weir 7'. In some circumstances, it is advantageous not to perfuse the entire surface of the foam but to keep an area close to the foam weir 7' clear. Then the loss of material can be avoided if, in this cleared area, unintentionally extracted fibers can successfully be rinsed back into the foam below it. A turbulence pipe 6 leads into the liquid layer 3 below the dividing area 5 and is suitable for forming a mixture of suspension and gas bubbles and for introducing it into the liquid layer. These gas bubbles rise through the liquid layer 3 until they become foam. As the turbulence pipe 6, a component already known from normal flotation cells, varied if necessary. can be used. This component is, e.g., provided with an injector and a turbulence generator so that the liquid flowing(g in is mixed with the gas G inside the pipe. It is suitable to remove the gas G used to form the gas bubbles from the cell volume above the foam 2. since this causes a gas circulation. It is especially advantageous to use a partial stream S1 of the accepted stock S' as the liquid for introduction into the turbulence pipe 6.

Figure 3:
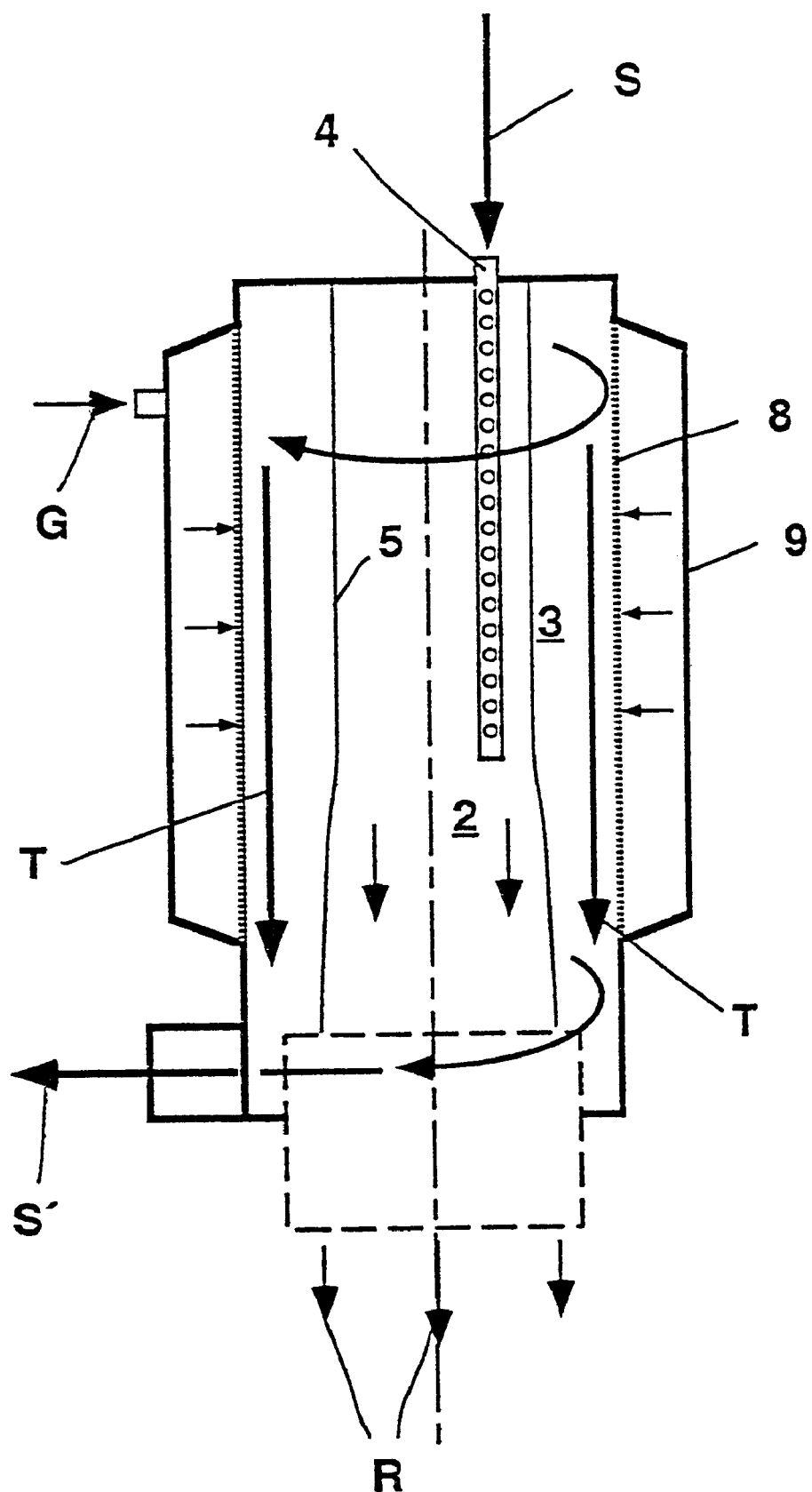
FIG. 3 schematically: performance of the process in a flotation cyclone.

FIG. 3 depicts another possibility for the technical embodiment of the invention. As mentioned before. a flotation process can be improved by creating a force field by way of centrifugal forces. in which the rising tendency of the gas bubbles is higher than in flotation in earth gravity. Flotation cyclones are an example of this. The process that takes place in a flotation cyclone is depicted schematically in FIG. 3. The suspension inside the cyclone is set into a rotating motion by appropriate mechanisms where such mechanisms can be either a driven agitator, a tangential inlet for air or for the suspension. or a tangential outlet for the accepted stock. In the case depicted here at the desired point, i.e., where the foam 2 is positioned during processing. the unaerated suspension S is introduced with the aid of at least one feed pipe 4, e.g., a jet pipe, where the positioning of the inlet holes creates a tangential current. The flotation process itself runs similarly to the one already described in FIGS. 1 and 2. The force field has a more or less strong radial component here, however, so that the rising direction of the bubbles adjusts itself from the outside towards the inside. This radial transport of gas bubbles and suspension overlaps with the axial transport T towards the outlet openings for the accepted stock S' and the flotation foam R. The addition of gas occurs with the aid of the air box 9 surrounding the cyclone. which box is connected to the inside by an air-permeable wall 8. The positioning of the flotation cyclone can also be upside down, e.g., with outlets on top or sideways or diagonally.

What is claimed is:

1. A process for the flotation of contaminates out of an aqueous fibrous suspension using a foam, the process comprising:

creating the foam by flotation through a suspension;

introducing a fibrous suspension into the foam;

transferring contaminates from the fibrous suspension to the foam; and removing some portion of the suspension as an accepted stock, wherein the fibrous suspension travels through the foam to the suspension.

2. The process of claim 1, wherein the creating comprises introducing gas bubbles into a liquid that includes the suspension.

3. The process of claim 1, wherein the foam is created in a device and wherein the device comprises:

a liquid containing area;

a mechanism for introducing a gas into the liquid containing area; and a mechanism for introducing the fibrous suspension into a foam containing area arranged to be adjacent the liquid containing area.

4. The process of claim 1, wherein the foam is created in a device and wherein the device comprises:

a liquid containing area;

a mechanism for introducing a gas into the liquid containing area;

a mechanism for introducing the fibrous suspension into a foam containing area arranged to be adjacent the liquid containing area; and a mechanism for receiving the accepted stock, wherein the mechanism for receiving the accepted stock maintains a static pressure in the liquid containing area.

5. The process of claim 1, wherein the foam is created in a device and wherein the device comprises:

a liquid containing area;

a mechanism for introducing a gas into the liquid containing area;

a mechanism for introducing the fibrous suspension into a foam containing area arranged to be adjacent the liquid containing area;

a mechanism for receiving the accepted stock; and a mechanism for introducing water into the foam containing area.

6. The process of claim 1, wherein the foam is created in a device and wherein the device comprises:

a rotating liquid containing area:

a mechanism for introducing a gas into the rotating liquid containing area;

a mechanism for introducing the fibrous suspension into a foam containing area arranged to be adjacent the liquid containing area; and a mechanism for receiving the accepted stock.

7. The process of claim 1, wherein the creating comprises introducing air bubbles into a liquid which contains the suspension.

8. The process of claim 1, wherein the creating comprises introducing gas bubbles into a liquid which comprises the suspension, the gas being one of lighter than air or heavier than air.

9. The process of claim 1, wherein the fibrous suspension is introduced into the foam disposed above a liquid.

10. The process of claim 1, wherein the fibrous suspension is introduced into the foam disposed adjacent a liquid being subjected to centrifugal forces.

11. The process of claim 1, wherein the creating comprises creating the foam in a flotation cyclone.

12. The process of claim 1, further comprising mixing the fibrous suspension with air prior to the introducing.

13. The process of claim 1, further comprising introducing water into the foam.

14. The process of claim 13, wherein the water comprises filtered backwater having a fiber content of not more than 20% of a fiber content of the fibrous suspension.

15. The process of claim 1, wherein the foam is guided by current influencing devices.

16. The process of claim 15, wherein the current influencing devices comprise perforated sheet metal.

17. The process of claim 1, wherein the foam is introduced into a confined area.

18. A process for the flotation of contaminates out of an aqueous fibrous suspension using a foam in a device which comprises a liquid containing area, a mechanism for introducing a gas into the liquid containing area, and a mechanism for introducing a fibrous suspension into a foam containing area arranged to be adjacent the liquid containing area, the process comprising:
   creating the foam in the liquid containing area by flotation, whereby the liquid containing area contains a suspension;
   introducing the fibrous suspension into the foam;
   transferring contaminates from the fibrous suspension to the foam; and
   removing some portion of the suspension as an accepted stock,
      wherein the fibrous suspension travels through the foam to the suspension.

19. The process of claim 18, wherein the device further comprises a mechanism for receiving the accepted stock,
   wherein the mechanism for receiving the accepted stock maintains a static pressure in the liquid containing area.

20. The process of claim 18, wherein the device further comprises a mechanism for receiving the accepted stock and a mechanism for introducing water into the foam containing area.

21. The process of claim 18, wherein the liquid containing area rotates and wherein the device further comprises a mechanism for receiving the accepted stock.

22. A device for the flotation of contaminates out of an aqueous fibrous suspension using a foam, the device comprising:
   a liquid containing area containing a liquid which includes a suspension;
   a mechanism for introducing a gas into the liquid containing area; and
   a mechanism for introducing a fibrous suspension into a foam containing area arranged to be adjacent the liquid containing area,
      wherein the foam is created in the liquid containing area by flotation, and
      wherein the fibrous suspension travels through the foam to the suspension.

23. The device of claim 22, wherein the mechanism for introducing a gas into the liquid containing area comprises a pipe and wherein the mechanism for introducing the fibrous suspension into the foam containing area comprises a feed pipe.

24. The device of claim 22, further comprising an adjustable water seal for receiving accepted stock.

25. The device of claim 22, further comprising a foam weir for receiving removed foam.

26. The device of claim 22, further comprising an air box and an air permeable wall surrounding the liquid.

27. The device of claim 22, further comprising:
   a mechanism for receiving the accepted stock,
      wherein the mechanism for receiving the accepted stock maintains a static pressure in the liquid containing area.

28. The device of claim 22, further comprising:
   a mechanism for receiving the accepted stock; and
   a mechanism for introducing water into the foam containing area.

29. The device of claim 22, wherein the liquid containing area rotates and wherein the device further comprises a mechanism for receiving the accepted stock.

30. A process for the flotation of contaminates out of an aqueous fibrous suspension using a foam, the process comprising:
   introducing a gas into a liquid which contains a suspension;
   creating a foam adjacent the liquid by flotation;
   introducing a fibrous suspension into the foam;
   the fibrous suspension moving, through the foam and towards the liquid which contains the suspension;
   transferring contaminates from the fibrous suspension to bubbles of the foam; and
   removing some portion of the suspension from the liquid as an accepted stock.

31. A device for the flotation of contaminates out of an aqueous fibrous suspension using a foam and a liquid the device comprising:
   a liquid containing area containing the liquid and a suspension;
   a foam containing area containing the foam;
   a mechanism for producing the foam by introducing a gas into the liquid; and
   a mechanism for introducing a fibrous suspension into the foam,
      wherein the device is adapted to remove contaminates from the fibrous suspension using bubbles of the foam,
      wherein the fibrous suspension is adapted to travel towards the liquid, and
      wherein some portion of the suspension is removed from the liquid as accepted stock.

* * * * *